(12) United States Patent
Leung et al.

(10) Patent No.: US 6,469,449 B1
(45) Date of Patent: Oct. 22, 2002

(54) SELF-POWERED COLD TEMPERATURE FLAT PANEL DISPLAYS AND METHOD OF MAKING SAME

(75) Inventors: Fee Chan Leung, Hazlet, NJ (US); Louis P. Jarvis, Brick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 6 days.

(21) Appl. No.: 09/876,653

(22) Filed: Jun. 7, 2001

(51) Int. Cl.[7] .................................................. H01J 1/30
(52) U.S. Cl. ..................... 315/169.3; 313/310
(58) Field of Search .................... 315/169.1–169.4; 313/495–497, 308–310, 518

(56) References Cited

U.S. PATENT DOCUMENTS 4,121,133 A * 10/1978 Ernsthausen ................. 313/518
6,359,378 B1 * 3/2002 Patterson et al. ............ 313/310

* cited by examiner

*Primary Examiner*—Don Wong
*Assistant Examiner*—Wilson Lee
(74) *Attorney, Agent, or Firm*—Michael Zelenka; George B. Tereschuk

(57) ABSTRACT

A self-powered cold temperature capable flat panel display is provided to use a heat byproduct from a group of PEM fuel cells to warm the flat panel display of a laptop computer. The self-powered cold temperature capable flat panel display system comprises a flat panel display, a PEM fuel cell assembly, a means for separating the display from the PEM fuel cell assembly and a hydrogen fuel source. A slot is located below the panel and the PEM fuel cell assembly is sufficiently thin to provide adequate space in the slot for the insertion of both the separation means and the PEM fuel cell assembly. Other embodiments include a cold temperature display system and an all-climate panel display and a method for warming a panel display.

69 Claims, 2 Drawing Sheets

SELF-POWERED COLD TEMPERATURE FLAT PANEL DISPLAYS AND METHOD OF MAKING SAME

GOVERNMENT INTEREST

The invention described herein may be manufactured, used, imported, sold, and licensed by or for the Government of the United States of America without the payment to us of any royalty thereon.

FIELD OF THE INVENTION

The field of the invention is flat display panels, and more particularly a self-powered cold temperature flat panel display to operate laptop computers and similar devices in cold weather temperatures of about −20 C.°.

BACKGROUND OF THE INVENTION

The Army is adopting laptop computers and flat displays for tactical usage in adverse climactic conditions such as extremely low temperatures. Similarly, many other computer users are finding more and more outdoor or rugged environments where laptop computers can provide useful data collection and other remote capabilities. Current flat display panels and displays on laptop computers will not operate when the temperatures drop between 0 C.° or −20 C.°. Because of these ambient temperature limitations, many users are either forced to forego the many useful outdoor applications of computer technology or increase battery size in order to provide power for a heater to warm the display. In the case of a typical 1 ft.×1 ft. color display, as much as 25 watts of power plus an additional 25 watts of heat are required to operate the display heater. This increased battery size results in the disadvantages of making the laptop cumbersome and bulky, and requires a substantial increased cost of purchasing high-powered batteries for heating purposes. The disadvantages of increased battery size and costs quickly become significant for the Army or any other organization that requires up-to-date computer technology in a remote or hostile cold temperature environment. Thus, there is a long-felt need for a self-powered flat panel display for cold weather applications.

A Proton Exchange Membrane (PEM) fuel cell can generate 30 watts of electric power and up to 17 watts of heat from the chemical reaction in the cell stacks. The PEM fuel cell is designed to remove heat that is an unwanted waste byproduct from a fuel cell system. The present invention is based on using the PEM fuel cell waste heat to warm a flat display in cold temperature conditions to provide a cold temperature display panel that does not suffer from the disadvantages and limitations of increased battery size, increased battery cost, bulkiness and a cumbersome computer device. The self-powered cold temperature capable flat panel display of the present invention allows a tactical military unit to realize the full potential of remote laptop computer use in a cold weather environment for important life-saving mission capabilities such as communications, situational awareness and target acquisition. The self-powered cold temperature capable flat panel display of the present invention allows other computer users to realize the full potential of remote laptop computer use in countless cold weather environments where computers would be useful and cost-effective.

SUMMARY OF THE INVENTION

It is one object of the present invention to provide a self-powered cold temperature capable flat panel display by disposing a PEM fuel cell in proximity to a flat panel display to use the PEM fuel cell's heat byproduct to warm the flat panel display.

It is another object of the present invention to provide a self-powered cold temperature capable flat panel display system comprising the display panel, a separation means and a PEM fuel cell.

To attain these objects and advantages, the present invention provides a self-powered cold temperature. capable flat panel display system comprising a flat panel display, a PEM fuel cell assembly and a means to separate the display panel from the PEM fuel cell assembly. The separation means further comprises a heat-absorbing panel for cold temperatures, or an insulating panel for uses in warmer climates, or one panel for both heat-absorption and insulation. The PEM fuel cell assembly further comprises a number of flat PEM cells stacked in a side-by-side fashion providing both sufficient wattage and operating voltage to both operate and heat the flat panel display. Combining the display, separation means and the PEM fuel cell assembly in this way provides adequate electrical power to heat the display, without the disadvantages, shortcomings and limitations of increased battery size and system bulkiness. The advantages of the present invention permit taking portable computer technology to rugged and remote field locales that were heretofore considered hostile environments due to the limitations imposed by cold weather.

By generating heat according to the principles of this invention, this invention's cold temperature capable flat panel display system operates at temperatures of between −20° C. and 50° C.

One embodiment of the present invention is a separation means that functions as a heat absorber. In another embodiment, the separation means functions as both an insulator to protect the display panel from heat in warm temperatures and as an absorber in cold temperatures. In the preferred embodiment, the separation means is composed of ceramic material to provide improved heat insulating properties. These and other features of the present invention will become apparent from the drawings and the Detailed Description of the Drawings. The scope of this invention is only limited by the annexed claims.

DETAILED DESCRIPTION OF THE DRAWINGS

Figure 1:
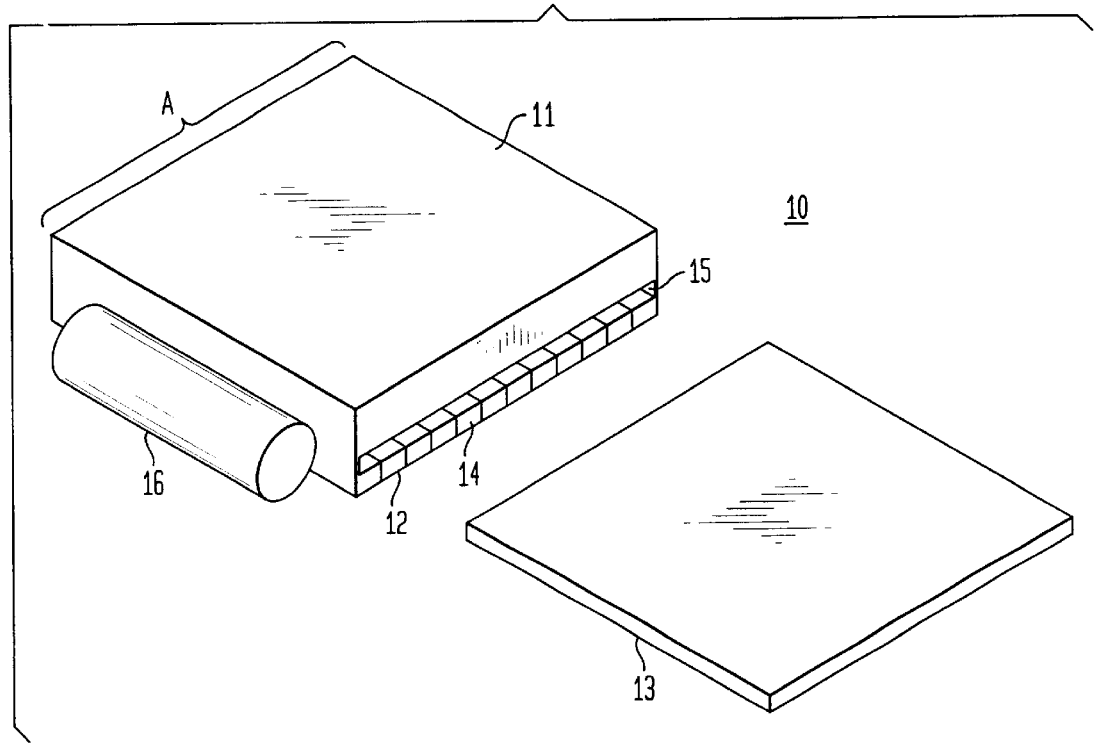
FIG. 1 is a perspective view of the self-powered cold temperature capable flat panel display of the present invention.

FIG. 1 depicts a perspective view of the self-powered cold temperature capable flat panel display 10 of the present invention. Referring now to FIG. 1, the cold temperature flat panel display system 10 comprises the flat panel display 11, a PEM fuel cell assembly 12, a means for separating 13 the display 11 from the PEM fuel cell assembly 12 and a hydrogen fuel source 16. A slot 15 is located below the panel 11. The PEM fuel cell assembly 12 is dimensioned to conform to the surface area A of the display panel 11 and be sufficiently thin to provide adequate space in slot 15 for the insertion of both the separation means 13 and PEM fuel cell assembly 12.

Figure 2:
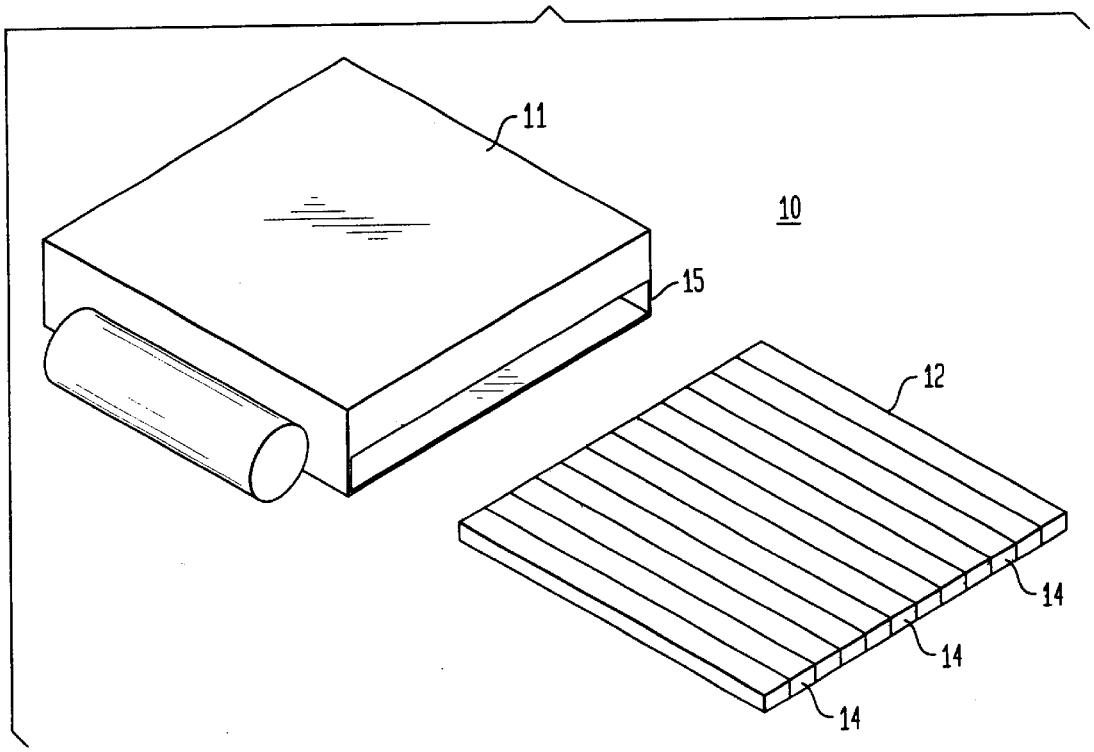
FIG. 2 is a perspective view of the self-powered cold temperature capable flat panel display of the present invention showing a PEM fuel cell assembly removed from the slot.

Referring now to FIG. 2, the PEM fuel cell assembly 12 further comprises a group of flat PEM fuel cells 14 stacked in a side-by-side arrangement. A hydrogen fuel source 16 is connected to the PEM fuel cell assembly 12. The group of flat PEM fuel cells 14 provides sufficient wattage and operating voltage to both operate and heat the panel display 11 at substantially colder temperatures than prior art display mechanisms did.

The hydrogen fuel source 16 provides heat as a by-product by virtue of the following chemical reaction:

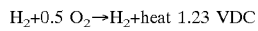

$$H_2 + 0.5\ O_2 \rightarrow H_2 + \text{heat } 1.23\ VDC$$

By generating 1.23 VDC electrical energy and heat according to this reaction, this invention's cold temperature capable flat panel display system 10 operates at temperatures of between −20° C. and 50° C. An operating temperature range of between −20° C. and 50° C. allows more diverse and versatile use than the typical prior art flat panel devices which do not operate below 0° C.

Referring back to FIG. 1, the separation means 13 is removed from slot 15 as would typically be the case during cold temperature operations. PEM fuel cell assembly 12 should be composed of a sufficient number of PEM fuel cells 14 to cover the surface area indicated by dimension A of the flat panel display 11, and to provide the necessary wattage and operating voltage for the display system 10. The preferred number of PEM fuel cells 14 is 12.

Figure 3:
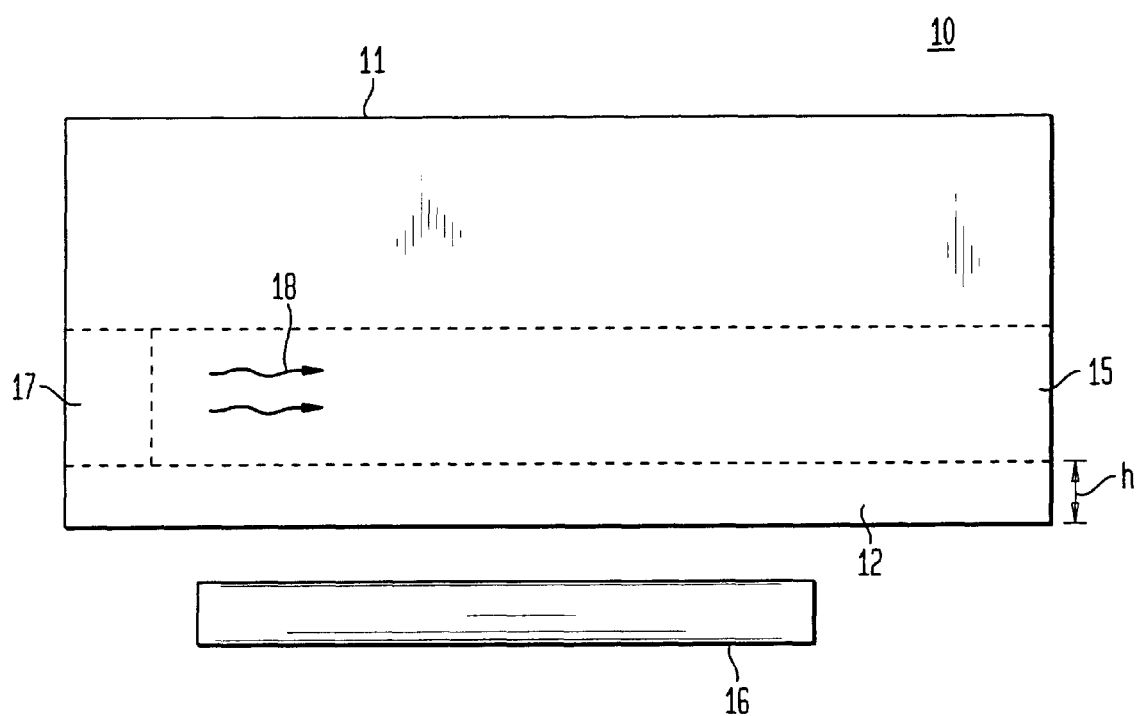
FIG. 3 is a cutaway side view of the self-powered cold temperature capable flat panel display of the present invention.

FIG. 3 is a cutaway side view of the cold temperature capable flat panel display system 10 of the present invention, with like numerals from FIGS. 1 and 2 for like structural elements and hydrogen fuel source 16 shown disconnected for the sake of clarity. Slot 15 is sufficiently large to accommodate both PEM fuel cell assembly 12 and the separation means 13. Dimension h is a representative height of 0.75 inches for PEM fuel cell assembly 12. A means for circulation 17, such as a small fan or blower, is disposed within the system 10 to circulate air, indicated by arrows 18, within slot 15 in proximity to the PEM fuel cell assembly 12. The air circulation means 17 can operate at variable speeds depending upon whether the system 10 is deployed in a hot or cold climate.

In hot climate operations, the separation means 13 is inserted within slot 15 to function as an insulator in order to absorb excess heat generated by the PEM fuel cell assembly 12 and prevent display 11 from being overheated. The separation means 13 is not needed for colder temperatures. The cold temperature capable flat panel display system 10 of the present invention operates at temperatures of between about −20° C. and 50° C.

Numerous variations of the self-powered cold temperature capable flat panel display system 10 are within the contemplation of the present invention. For example, the separation means 13 can operate as both an insulation panel for colder weather and a heat absorber for warmer temperatures. The fuel cell assembly 12, separation means 13 and display panel 11 can be fabricated to be as thin as about two inches. Similarly, the display panel 11 may be any commercial-off-the-shelf color or black/white display panel with a liquid crystal, or other types of display panel. The separation means 13 can be constructed of any heat insulating material, including ceramic polymer, fiberglass, fiberglass polymer, fluids such as flowing water, a flowing liquid, flowing air or a flowing gas.

The present invention also encompasses a method of warming a panel display, comprising the steps of inserting a plurality of PEM fuel cells in a slot below a flat panel display, connecting said plurality of PEM fuel cells to a hydrogen fuel source, generating water, an electrical current and a thermal by-product from said plurality of PEM fuel cells, operating said display with said electrical current and warming said flat panel display for cold-weather operations. A number of variations that apply to the other embodiments of this invention apply equally to the method of the present invention.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, stacking arrangements and dimensions can achieve the results described herein, without departing from the spirit and scope of this invention. Accordingly, the present invention should not be limited by the foregoing description, but only by the appended claims.

What we claim is:

1. An all-climate panel display system, comprising:
    a flat panel display;
    plurality of Proton Exchange Membrane (PEM) fuel cells inserted in a slot below said display is connected to a hydrogen fuel source;
    a means for separation separates said display means from said plurality of PEM fuel cells;
    said plurality of PEM fuel cells generate water, an electrical current and a thermal byproduct, said electrical current operates said display; and
    said thermal by-product warms said display permitting cold temperature operations.

2. The all-climate panel display system, as recited in claim 1, further comprising said slot having a given height.

3. The all-climate panel display system, as recited in claim 2, further comprising forming a PEM fuel cell assembly by stacking said plurality of PEM fuel cells sideways.

4. The all-climate panel display system, as recited in claim 3, further comprising:
    a means for circulation circulates air in said slot;
    said PEM fuel cell assembly having a lesser height than said given height; and
    said PEM fuel cell assembly and said means for separation are stacked within said given height.

5. The all-climate panel display system, as recited in claim 4, further comprising said separation means functioning as an insulator against excessive heat in warm temperatures.

6. The all-climate panel display system, as recited in claim 4, further comprising said separation means functions as a heat absorber in cold temperatures.

7. The all-climate panel display system, as recited in claim 6, further comprising said separation means being removable from said slot.

8. The all-climate panel display system, as recited in claim 7, further comprising said system operates said display in cold temperatures between about −20 C.° to 0 C.°.

9. The all-climate panel display system, as recited in claim 8, further comprising said display operates in warm temperatures of about 50 C.°.

10. The all-climate panel display system, as recited in claim 9, further comprising said system operates said display in a temperature range between about −20 C.° to about 50 C.°.

11. The all-climate panel display system, as recited in claim 10, further comprising said system operates said display in a temperature range between −20 C.° to 50 C.°.

12. The all-climate panel display system, as recited in claim 11, further comprising said separation means is composed of a heat insulating material.

13. The all-climate panel display system, as recited in claim 12, further comprising said separation means is composed of a ceramic polymer.

14. The all-climate panel display system, as recited in claim 4, further comprising said circulation means is disposed within said slot in proximity to said PEM fuel cell assembly.

15. The all-climate panel display system, as recited in claim 4, further comprising said circulation means is a fan.

16. A cold-temperature panel display apparatus, comprising:
   a flat panel display;
   a plurality of PEM fuel cells inserted in a slot below said display is connected to a hydrogen fuel source;
   a means for separation separates said display means from said plurality of PEM fuel cells;
   said plurality of PEM fuel cells generate water, an electrical current and a thermal by-product, said electrical current operates said display; and
   said thermal by-product warms said display to permit cold temperature operations.

17. The cold-temperature panel display apparatus, as recited in claim 16, further comprising said slot having a given height.

18. The cold-temperature panel display apparatus, as recited in claim 17, further comprising forming a PEM fuel cell assembly by stacking said plurality of PEM fuel cells sideways.

19. The cold-temperature panel display apparatus, as recited in claim 18, further comprising:
   a means for circulation circulates air in proximity to said PEM fuel cell assembly;
   said PEM fuel cell assembly having a lesser height than said given height; and
   said PEM fuel cell assembly and said means for separation are stacked within said given height.

20. The cold-temperature panel display apparatus, as recited in claim 19, further comprising said separation means functioning as an insulator against excessive heat in warm temperatures.

21. The cold-temperature panel display apparatus, as recited in claim 19, further comprising said separation means functions as a heat absorber in cold temperatures.

22. The cold-temperature panel display apparatus, as recited in claim 21, further comprising said separation means being removable from said slot.

23. The cold-temperature panel display apparatus, as recited in claim 22, further comprising said display operates in cold temperatures between about −20 C.° to 0 C.°.

24. The cold-temperature panel display apparatus, as recited in claim 23, further comprising said display operates in a warm temperatures of about 50 C.°.

25. The cold-temperature panel display apparatus, as recited in claim 24, further comprising said system operates said display in a temperature range between about −20 C.° to about 50 C.°.

26. The cold-temperature panel display apparatus, as recited in claim 25, further comprising said system operates said display in a temperature rage between −20 C.° to 50 C.°.

27. The cold-temperature panel display apparatus, as recited in claim 26, further comprising said separation means is composed of a heat insulating material.

28. The cold-temperature panel display apparatus, as recited in claim 27, further comprising said separation means is composed of a ceramic polymer.

29. The cold-temperature panel display apparatus, as recited in claim 19, further comprising said circulation means is disposed within said slot in proximity to said PEM fuel cell assembly.

30. The cold-temperature panel display apparatus, as recited in claim 19, further comprising said circulation means is a fan.

31. A cold-temperature panel display system, comprising:
   a flat panel display;
   a plurality of PEM fuel cells, inserted in a slot below said display, is connected to a hydrogen fuel source;
   said slot having a given height, and said plurality of PEM fuel cells and a means for separation fit within said given height;
   said separation means, functioning as an insulator against excessive heat in warm temperatures, being removable from said slot;
   said plurality of PEM fuel cells generate water, an electrical current and a thermal by-product, said electrical current operates said display; and
   said thermal by-product warms said display to permit cold temperature operations in temperatures between about −20 C.° to 0 C.°.

32. The cold-temperature panel display system, as recited in claim 31, further comprising said plurality of PEM fuel cells being stacked sideways to form a PEM fuel cell assembly.

33. The cold-temperature panel display system, as recited in claim 32, further comprising:
   a means for circulation circulates air in proximity to said PEM fuel cell assembly; and
   said PEM fuel cell assembly having a lesser height than said given height.

34. The cold-temperature panel display system, as recited in claim 33, further comprising said separation means functions as a heat absorber in cold temperatures.

35. The cold-temperature panel display system, as recited in claim 34, further comprising said display operates in a warm temperatures of about 50 C.°.

36. The cold-temperature panel display system, as recited in claim 35, further comprising said display operates in a temperature range between about −20 C.° to about 50 C.°.

37. The cold-temperature panel display system, as recited in claim 36, further comprising further comprising said display operates in a temperature range between −20 C.° to 50 C.°.

38. The cold-temperature panel display system, as recited in claim 37, further comprising said separation panel is composed of a heat insulating material.

39. The cold-temperature panel display system, as recited in claim 38, further comprising said separation panel is composed of a ceramic polymer.

40. The cold-temperature panel display system, as recited in claim 38, further comprising said separation panel is composed of fiberglass and a fiberglass polymer.

41. The cold-temperature panel display system, as recited in claim 38, further comprising said separation panel is composed of a circulating fluid.

42. The cold-temperature panel display system, as recited in claim 41, further comprising said circulating fluid is water.

43. The cold-temperature panel display system, as recited in claim 38, further comprising said circulation means is disposed within said slot in proximity to said PEM fuel cell assembly.

44. The cold-temperature panel display system, as recited in claim 38, further comprising said circulation means is part of said PEM fuel cell assembly.

45. The cold-temperature panel display system, as recited in claim 43, further comprising said circulation means is a fan.

46. A method of warming a panel display, comprising the steps of:

inserting a plurality of PEM fuel cells in a slot below a flat panel display;

separating said display and said plurality of PEM fuels cells with a means for separation;

connecting said plurality of PEM fuel cells to a hydrogen fuel source;

generating water, an electrical current and a thermal by-product from said plurality of PEM fuel cells;

operating said display with said electrical current; and warming said flat panel display for cold-weather operations.

47. The method of warming a panel display, as recited in claim 46, further comprising the step of forming a PEM fuel cell assembly from said plurality of PEM fuel cells.

48. The method of warming a panel display, as recited in claim 47, further comprising the step of stacking said group of flat PEM fuel cells sideways within said slot.

49. The method of warming a panel display, as recited in claim 48, further comprising the step of forming said slot with a given height.

50. The method of warming a panel display, as recited in claim 49, further comprising the step of forming said PEM fuel cell assembly with a lesser height than said given height.

51. The method of warming a panel display, as recited in claim 50, further comprising the step of the step of circulating air within said slot.

52. The method of warming a panel display, as recited in claim 51, further comprising the step of circulating air in proximity to said PEM fuel cell assembly.

53. The method of warming a panel display, as recited in claim 52, further comprising the step of circulating air with a means for circulation.

54. The method of warming a panel display, as recited in claim 53, further comprising the step of stacking said PEM fuel cell assembly and said separation means within said slot.

55. The method of warming a panel display, as recited in claim 54, further comprising the step of insulating said flat panel display against excessive heat in warm temperatures with said separation means.

56. The method of warming a panel display, as recited in claim 54, further comprising the step of absorbing heat with said separation means in cold temperatures.

57. The method of warming a panel display, as recited in claim 55, further comprising the step of removing said separation means from said slot.

58. The method of warming a panel display, as recited in claim 56, further comprising the step of operating said display in cold temperatures between about $-20$ C.$^\circ$ to $0$ C.$^\circ$.

59. The method of warming a panel display, as recited in claim 58, further comprising the step of operating said display in warm temperatures of about $50$ C.$^\circ$.

60. The method of warming a panel display, as recited in claim 59, further comprising the step of operating said flat panel display in a temperature range between about $-20$ C.$^\circ$ to about $50$ C.$^\circ$.

61. The method of warming a panel display, as recited in claim 60, further comprising the step of operating said flat panel display in a temperature range between $-20$ C.$^\circ$ to $50$ C.$^\circ$.

62. The method of warming a panel display, as recited in claim 61, further comprising the step of placing said circulation means within said slot in proximity to said PEM fuel cell assembly.

63. The method of warming a panel display, as recited in claim 62, further comprising the step of incorporating said circulation means in said PEM fuel cell assembly.

64. The method of warming a panel display, as recited in claim 63, wherein said circulation means is a fan.

65. The method of warming a panel display, as recited in claim 64, further comprising said separation panel is composed of a heat insulating material.

66. The method of warming a panel display, as recited in claim 65, further comprising said heat insulating material is a ceramic polymer.

67. The method of warming a panel display, as recited in claim 65, further comprising said heat insulating material is a fiberglass and a fiberglass polymer.

68. The method of warming a panel display, as recited in claim 65, further comprising said separation panel is composed of a circulating fluid.

69. The method of warming a panel display, as recited in claim 68, further comprising said circulating fluid is water.

* * * * *